(12) United States Patent
Balutkar et al.

(10) Patent No.: US 11,971,131 B1
(45) Date of Patent: Apr. 30, 2024

(54) STAND SYSTEM FOR PORTABLE ELECTRONIC DEVICE

(71) Applicant: Pioneer Square Brands, Inc., Seattle, WA (US)

(72) Inventors: Vrushank Deepak Balutkar, Jamestown, NC (US); Riley Edwin Lynch, Greensboro, NC (US); Mark Elliott Jones, Greensboro, NC (US)

(73) Assignee: Pioneer Square Brands, Inc., High Point, NC (US)

( * ) Notice: Subject to any disclaimer, the term of this patent is extended or adjusted under 35 U.S.C. 154(b) by 0 days.

(21) Appl. No.: 18/501,847

(22) Filed: Nov. 3, 2023

Related U.S. Application Data

(63) Continuation-in-part of application No. 18/501,682, filed on Nov. 3, 2023.

(51) Int. Cl.
*F16M 11/04* (2006.01)
*F16M 11/20* (2006.01)

(52) U.S. Cl.
CPC ....... *F16M 11/2014* (2013.01); *F16M 11/041* (2013.01); *F16M 2200/021* (2013.01)

(58) Field of Classification Search
CPC .............................. F16M 11/041; F16M 11/22
USPC ....... 248/176.1, 177.1, 127, 146, 154, 187.1
See application file for complete search history.

(56) References Cited

U.S. PATENT DOCUMENTS

| | | | |
|---|---|---|---|
| 6,042,080 A * | 3/2000 | Shepherd | B60R 11/00 248/688 |
| 11,399,640 B2 * | 8/2022 | Berglund | E05B 73/0005 |
| 2013/0168527 A1 * | 7/2013 | Wheeler | A47F 7/024 248/553 |
| 2014/0362517 A1 * | 12/2014 | Moock | E05B 47/0012 248/553 |
| 2021/0270410 A1 * | 9/2021 | Horvath | F16M 13/02 |

* cited by examiner

*Primary Examiner* — Alfred J Wujciak
(74) *Attorney, Agent, or Firm* — Grandview Law

(57) ABSTRACT

A stand system for a portable electronic device includes a column having a top end removably couplable to the portable electronic device; and a foundational platform, wherein the foundational platform is rotatably coupled to the column. Other aspects are described in the claims, drawings, and text forming a part of the present disclosure.

14 Claims, 27 Drawing Sheets

STAND SYSTEM FOR PORTABLE ELECTRONIC DEVICE

SUMMARY

In one or more aspects a stand system for a portable electronic device including (I) a column assembly including a column having a top end, a bottom end, and at least one length, wherein the top end of the column is distanced from the bottom end of the column by the at least one length, wherein the top end of the column is removably couplable to the portable electronic device; and (II) a foundational platform, wherein the foundational platform is rotatably coupled to the column assembly and the at least one length of the column is vertically oriented when the foundational platform is positioned on a horizontally oriented surface below the column. Wherein the foundational platform includes a base plate with an upper surface having a peripheral shape, and wherein the bottom end of the column has a peripheral shape the same as the peripheral shape of the upper surface of the base plate of the foundational platform. Further including a bearing assembly, wherein the bearing assembly separates the column assembly from the foundation platform assembly by an airgap. Wherein the foundational platform includes a base plate with an upper surface, wherein the foundational platform includes a tubular protrusion centrally positioned on the base plate and extending from the upper surface of the base plate, and wherein the tubular protrusion includes an interior. Wherein the tubular protrusion of the foundational platform includes an upper surface, and wherein the foundational platform includes a semi-circular projection extending from the upper surface of the tubular protrusion. Wherein the column assembly includes a cylindrical enclosure rotatably coupled with the tubular protrusion of the foundational platform assembly, wherein the cylindrical enclosure includes a base with a protrusion extending therefrom, and wherein at a first rotational position of the tubular protrusion relative to the cylindrical enclosure, the protrusion of the base of the cylindrical enclosure contacts the semi-circular projection extending from the upper surface of the tubular protrusion thereby preventing a full 360 degree rotation of the tubular protrusion relative to the cylindrical enclosure. Wherein the base plate of the foundational platform includes diagonally spaced apertures shaped to each receive an anchoring screw. Wherein the foundational platform includes at least one magnet embedded in the base plate of the foundational platform adjacent to the upper surface of the base plate, wherein the column assembly includes at least one magnet embedded in the bottom end of the column, and wherein the at least one magnet of the foundational platform engages with the at least one magnet of the column assembly when the column assembly is positioned in a first rotational position relative to the foundational platform. Wherein the column assembly includes a cylindrical enclosure having a cylindrical socket with a base and having a centrally positioned cylindrical projection extending from the base of the cylindrical socket, and wherein the centrally positioned cylindrical projection is rotatably coupled with the interior of the tubular protrusion of the foundational platform assembly. Wherein the column including an interior, and wherein the base plate of the foundational platform has a side and a channel with a channel opening through the side that provides access to the interior of the column. Further including a bearing assembly, wherein the bearing assembly is positioned inside of the interior of the tubular protrusion. Wherein the tubular protrusion includes a concentric lip circumferentially bounding an upper portion of the interior of the tubular protrusion, wherein the bearing assembly includes a central aperture, an inner race, a plurality of bearings, and an outer race separated from the inner race by the plurality of bearings, and wherein the outer race of the bearing assembly is in contact with concentric lip of the tubular protrusion. Wherein the column assembly includes a cylindrical enclosure with a base and having a centrally positioned cylindrical projection extending from the base of the cylindrical socket, and wherein the inner race of the bearing assembly is in contact with the cylindrical projection of the cylindrical enclosure of the column assembly. Further including a bolt and a washer, wherein the bearing assembly includes a central aperture, an inner race, a plurality of bearings, and an outer race separated from the inner race by the plurality of bearings, wherein the cylindrical projection of the cylindrical enclosure includes a threaded aperture coupled with the bolt, and wherein the washer is pressed against the inner race of the bearing assembly by the bolt.

In one or more aspects a stand system including (I) a column assembly including a column having a top end, a bottom end distanced from the top end by at least one length; and (II) a foundational platform, wherein the foundational platform is movably coupled to the bottom end of the column of the column assembly. Wherein the foundational platform includes a base plate with an upper surface having a peripheral shape, and wherein the bottom end of the column has a peripheral shape the same as the peripheral shape of the upper surface of the base plate of the foundational platform. Wherein the bearing assembly separates the column assembly from the foundation platform assembly by an airgap.

In one or more aspects a stand system for a portable electronic device including (I) a column assembly including a column having a top end, a bottom end, and at least one length, wherein the top end of the column is distanced from the bottom end of the column by the at least one length, wherein the top end of the column is removably couplable to the portable electronic device; and (II) a foundational platform, wherein the foundational platform includes a base plate with an upper surface, wherein the foundational platform includes a tubular protrusion centrally positioned on the base plate and extending from the upper surface of the base plate, wherein the tubular protrusion includes an interior, and wherein the tubular protrusion of the foundational platform is rotatably coupled to the column assembly. Wherein the tubular protrusion of the foundational platform includes an upper surface, and wherein the foundational platform includes a semi-circular projection extending from the upper surface of the tubular protrusion, wherein the column assembly includes a cylindrical enclosure rotatably coupled with the tubular protrusion of the foundational platform assembly, wherein the cylindrical enclosure includes a base with a protrusion extending therefrom, and wherein at a first rotational position of the tubular protrusion relative to the cylindrical enclosure, the protrusion of the base of the cylindrical enclosure contacts the semi-circular projection extending from the upper surface of the tubular protrusion thereby preventing a full 360 degree rotation of the tubular protrusion relative to the cylindrical enclosure. Wherein the column assembly includes a cylindrical enclosure having a cylindrical socket with a base and having a centrally positioned cylindrical projection extending from the base of the cylindrical socket, and wherein the centrally positioned cylindrical projection is rotatably coupled with the interior of the tubular protrusion of the foundational platform assembly.

In addition to the foregoing, other aspects are described in the claims, drawings, and text forming a part of the disclosure set forth herein. Various other aspects are set forth and described in the teachings such as text (e.g., claims and/or detailed description) and/or drawings of the present disclosure. The foregoing is a summary and thus may contain simplifications, generalizations, inclusions, or omissions of detail; consequently, those skilled in the art will appreciate that the summary is illustrative only and is NOT intended to be in any way limiting. Other aspects, features, and advantages of the devices and/or processes and/or other subject matter described herein will become apparent in the teachings set forth herein.

BRIEF DESCRIPTION OF THE FIGURES

For a more complete understanding of implementations, reference now is made to the following descriptions taken in connection with the accompanying drawings. The use of the same symbols in different drawings typically indicates similar or identical items, unless context dictates otherwise.

With reference now to the figures, shown are one or more examples of Stand for Portable Electronic Device, articles of manufacture, compositions of matter for same that may provide context, for instance, in introducing one or more processes and/or devices described herein.

DETAILED DESCRIPTION

Figure 1:
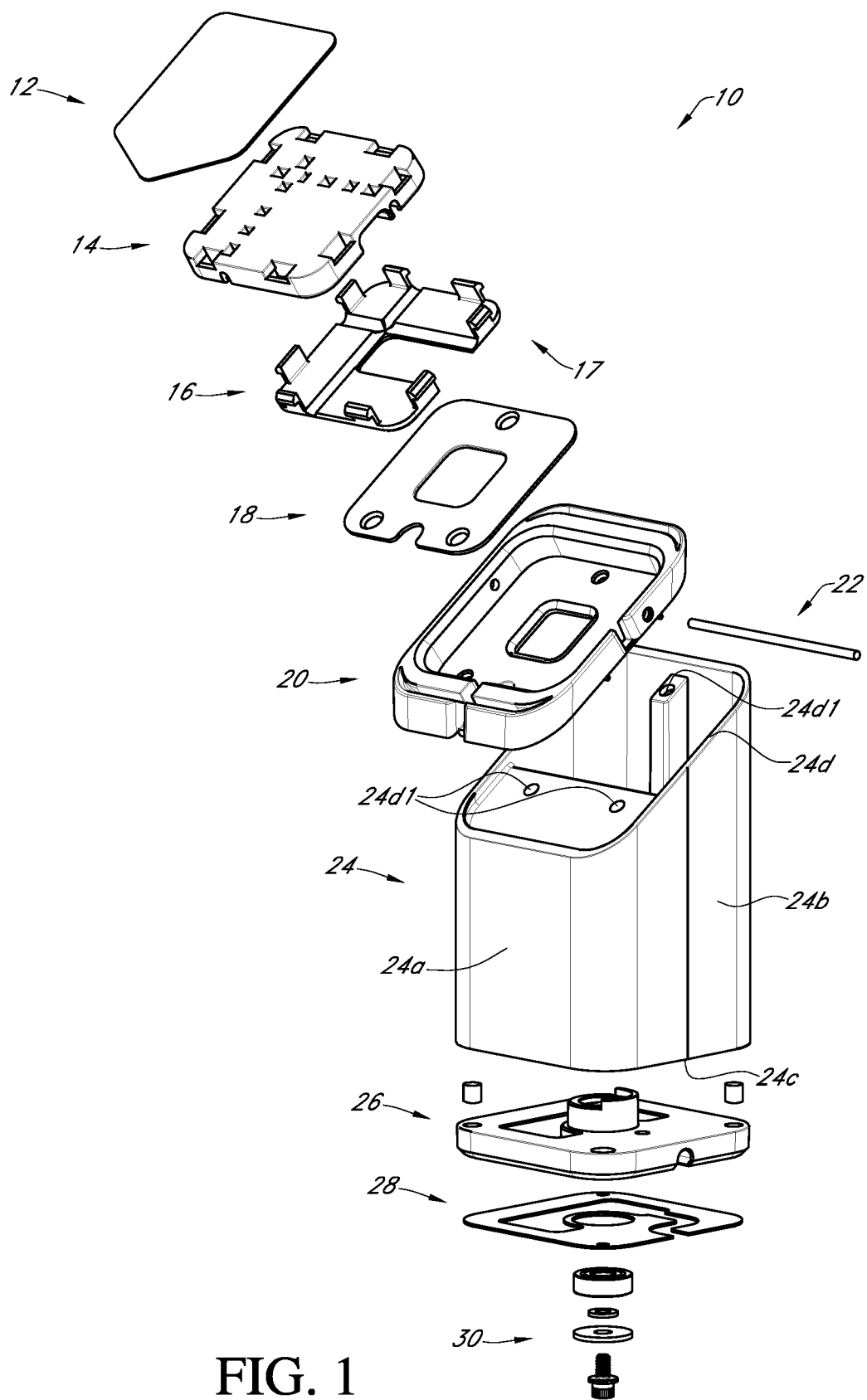
FIG. 1 is an exploded top perspective view of stand assembly 10.

In the following detailed description, reference is made to the accompanying drawings, which form a part hereof. In the drawings, similar symbols typically identify similar components, unless context dictates otherwise. The illustrative implementations described in the detailed description, drawings, and claims are not meant to be limiting. Other implementations may be utilized, and other changes may be made, without departing from the spirit or scope of the subject matter presented here.

Turning to FIG. 1, depicted therein is an exploded top perspective view of stand assembly 10. Depicted implementation of stand assembly 10 is shown to include double-sided adhesive member 12 (such as double-sided adhesive tape), upper member 14, upper coupler assembly 17, and metallic plate 18 with upper coupler assembly 17 including double-sided adhesive member 12, upper member 14, and lower member 16. Depicted implementation of stand assembly 10 is shown to include metallic plate 18, cap member 20, pin 22 (an example of an elongated member), column assembly 24 with column side 24a, column side 24b, column bottom end 24c, and column top end 24d with aperture 24d1. Depicted implementation of stand assembly 10 is shown to include foundational platform 26, double-sided adhesive member 28 (such as double-sided adhesive tape) having oppositely facing adherent surfaces, and lower coupler assembly 30.

Figure 2:
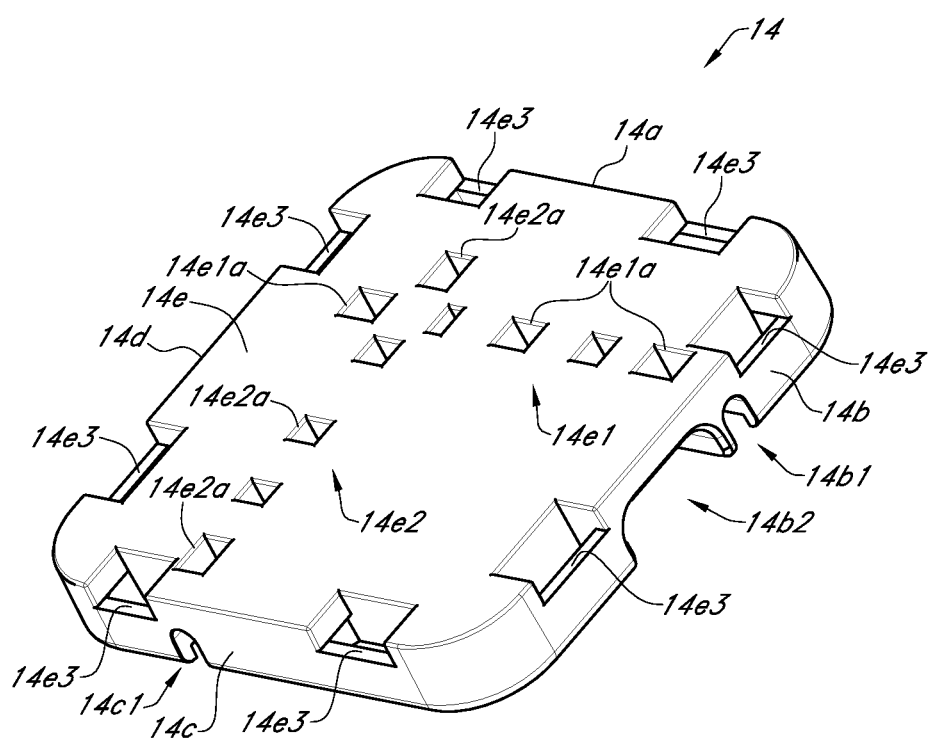
FIG. 2 is a top perspective view of upper member 14 of stand assembly 10.

Turning to FIG. 2, depicted therein is a top perspective view of upper member 14 of stand assembly 10. Depicted implementation of upper member 14 is shown to include side 14a, side 14b with channel 14b1 and channel 14b2, side 14c with channel 14c1, side 14d, upper base side 14e with aperture arrangement 14e1, aperture arrangement 14e2, and slot 14e3. Depicted implementation of aperture arrangement 14e1 is shown to include aperture 14e1a, aperture arrangement 14e2, and aperture 14e2a.

Figure 3:
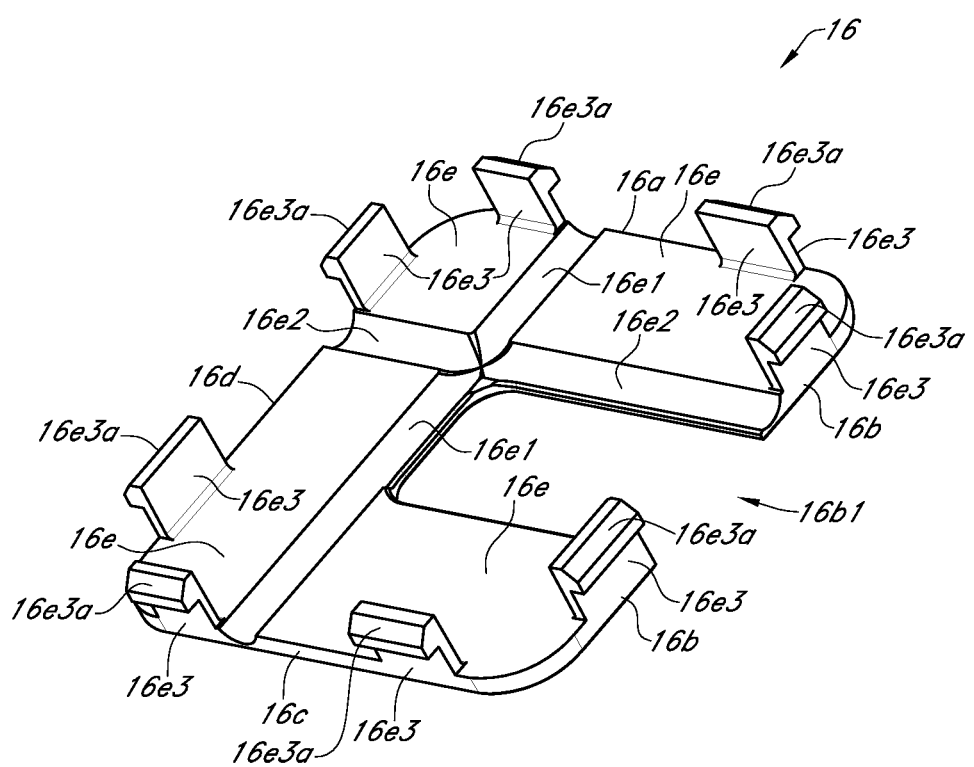
FIG. 3 is a top perspective view of lower member 16 of stand assembly 10.

Turning to FIG. 3, depicted therein is a top perspective view of lower member 16 of stand assembly 10. Depicted implementation of lower member 16 is shown to include side 16a, side 16b with channel 16b1, side 16c, side 16d, upper base surface 16e with channel 16e1, channel 16e2, and stem 16e3 with prong 16e3a.

Figure 4:
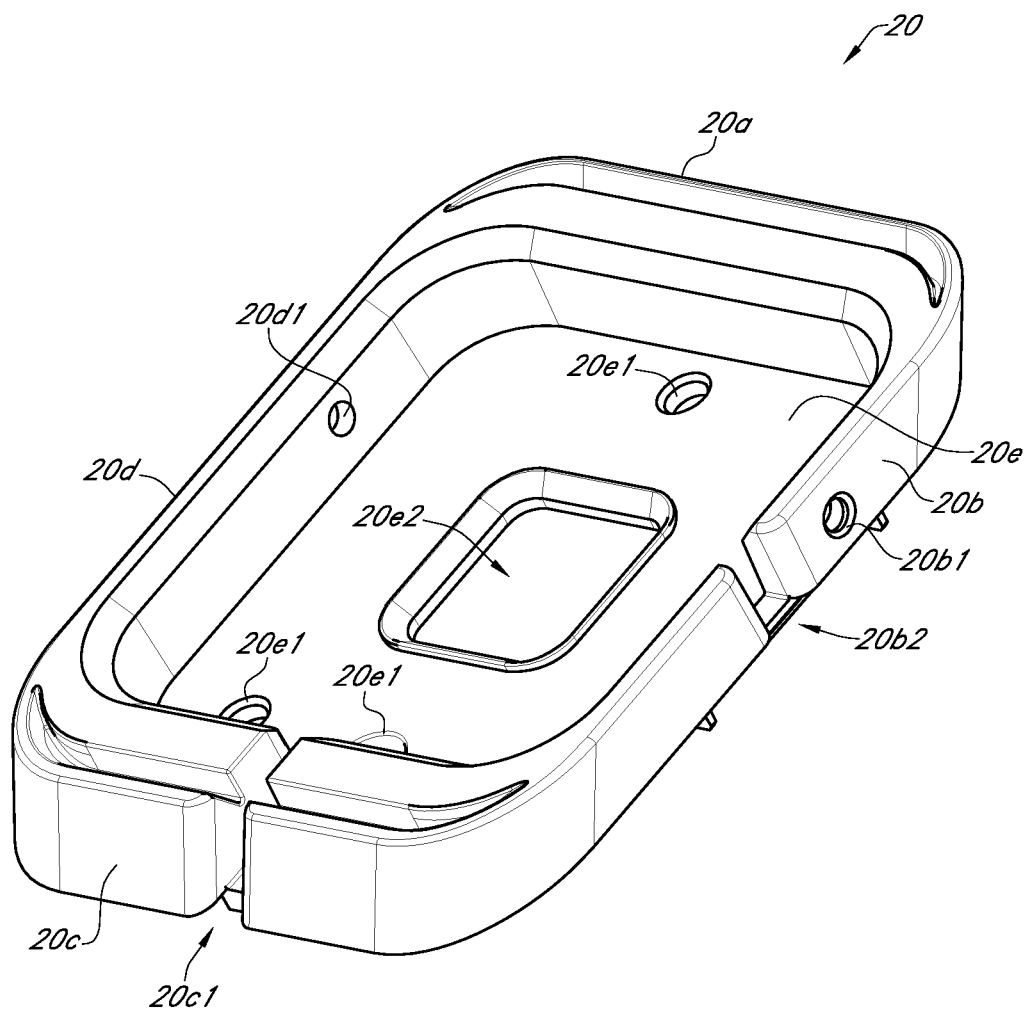
FIG. 4 is a top perspective view of cap member 20 of stand assembly 10.

Turning to FIG. 4, depicted therein is a top perspective view of cap member 20 of stand assembly 10. Depicted implementation of cap member 20 is shown to include side 20a, side 20b with aperture 20b1 and slot 20b2, side 20c with slot 20c1, side 20d with aperture 20d1, and base 20e with aperture 20e1 and aperture 20e2. As depicted, aperture 20b1 and aperture 20d1 serve as a mechanical coupler along with pin 22 being removably couplable therewith and along with channel 16e1, channel 16e2 serving as mechanical couplers being removably couplable with pin 22 as well.

Figure 5:
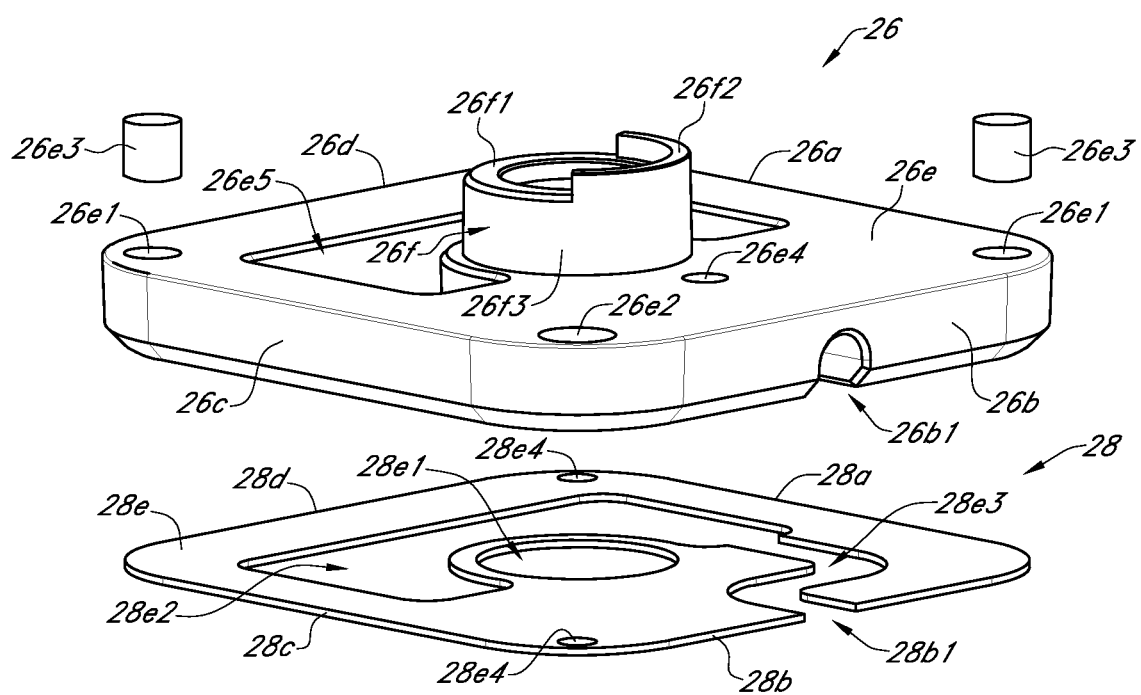
FIG. 5 is a top perspective view of foundational platform 26 and double-sided adhesive member 28 of stand assembly 10.

Turning to FIG. 5, depicted therein is a top perspective view of foundational platform 26 and double-sided adhesive member 28 of stand assembly 10. Depicted implementation of foundational platform 26 is shown to include side 26a, side 26b with channel 26b1, side 26c, side 26d, and base plate 26e with aperture 26e1, aperture 26e2, magnet 26e3, aperture 26e4, and open area 26e5. Depicted implementation of foundational platform 26 is shown to include tubular protrusion 26f, with upper surface 26f1, semi-circular projection 26f2, and exterior portion 26f3.

Depicted implementation of double-sided adhesive member 28 is shown to include side 28a, side 28b with channel opening 28b1, side 28c, side 28d, base 28e with central aperture 28e1, opening area 28e2, channel 28e3, and aperture 28e4.

Figure 6:
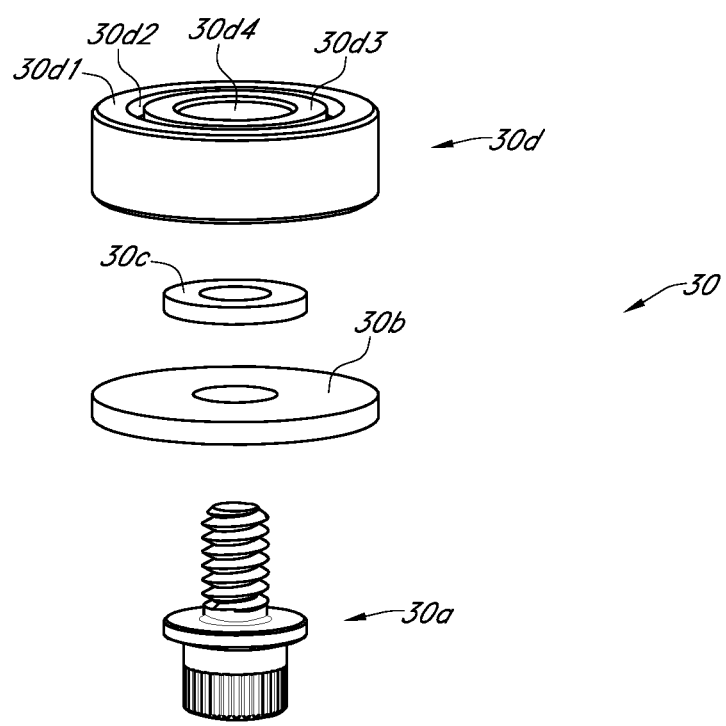
FIG. 6 is a top perspective view of lower coupler assembly 30 of stand assembly 10.

Turning to FIG. 6, depicted therein is a top perspective view of lower coupler assembly 30 of stand assembly 10. Depicted implementation of lower coupler assembly 30 is shown to include bolt 30a, washer 30b, washer 30c, bearing assembly 30d with outer race 30d1, ball plurality 30d2, inner race 30d3, and aperture 30d4.

Figure 7:
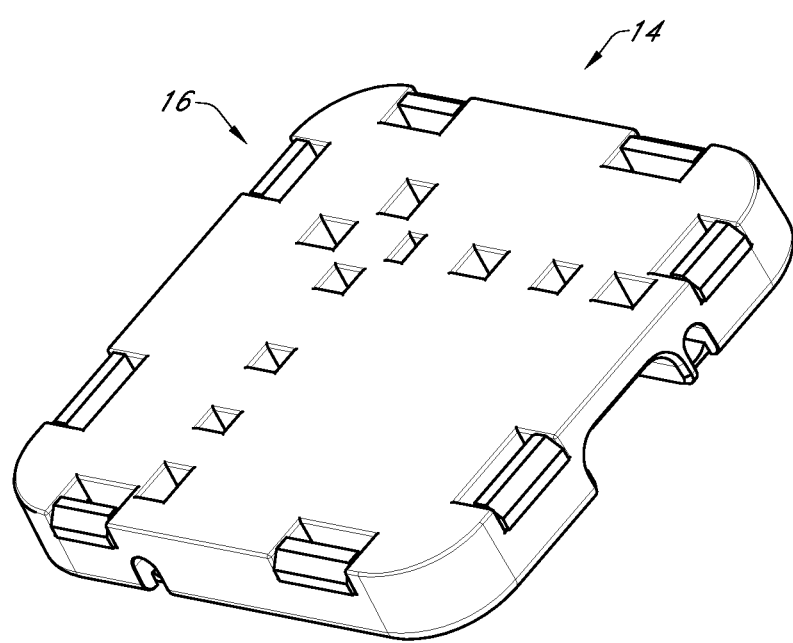
FIG. 7 is a top perspective view of upper member 14 and lower member 16 of stand assembly 10.

Turning to FIG. 7, depicted therein is a top perspective view of upper member 14 and lower member 16 of stand assembly 10.

Figure 8:
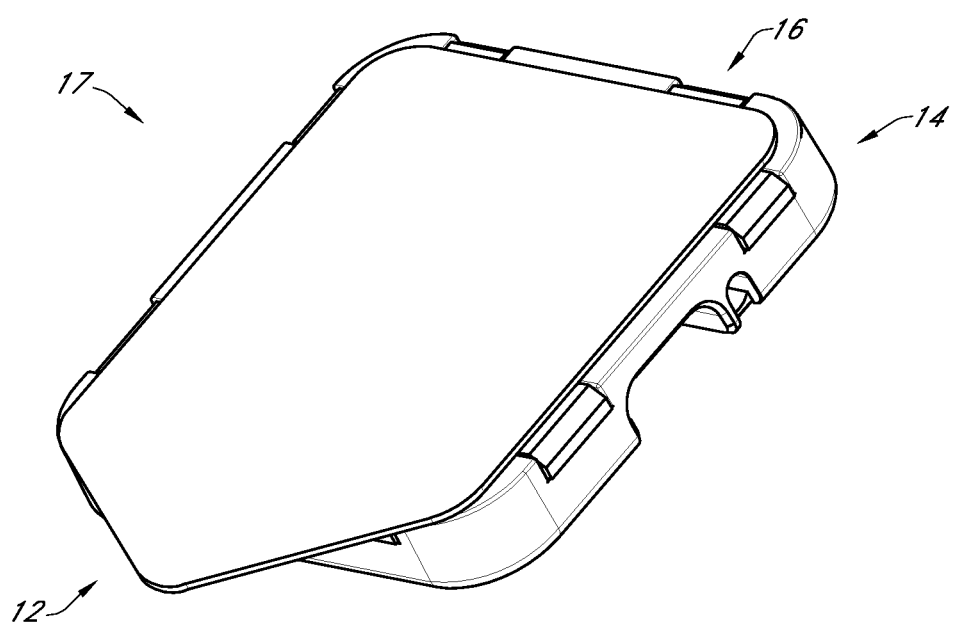
FIG. 8 is a top perspective view of upper coupler assembly of stand assembly 10.

Turning to FIG. 8, depicted therein is a top perspective view of upper coupler assembly 17 of stand assembly 10.

Figure 9:
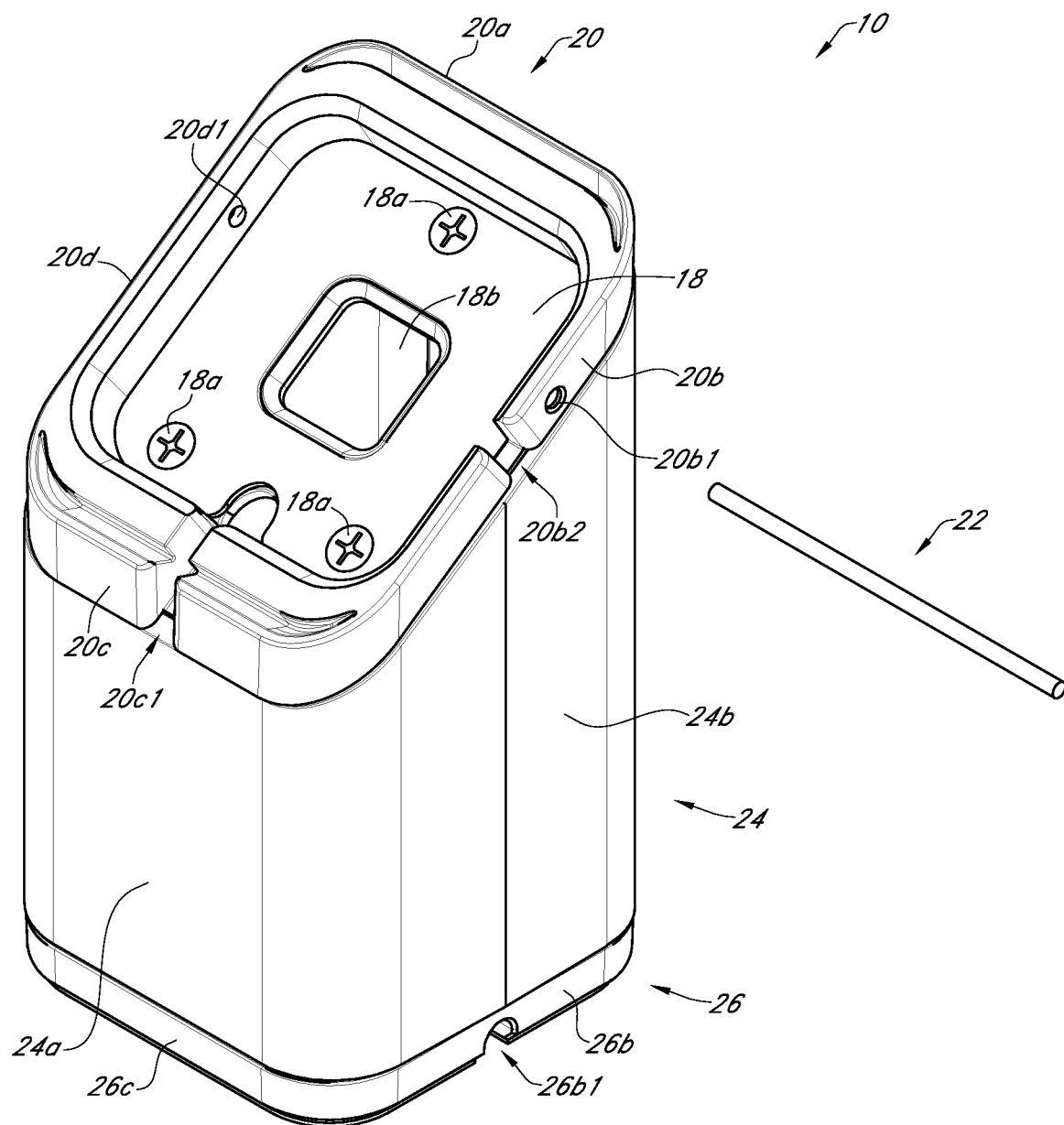
FIG. 9 is a top perspective partial view of stand assembly 10.

Turning to FIG. 9, depicted therein is a top perspective partial view of stand assembly 10 showing metallic plate 18 to include screw 18a and aperture 18b.

Figure 10:
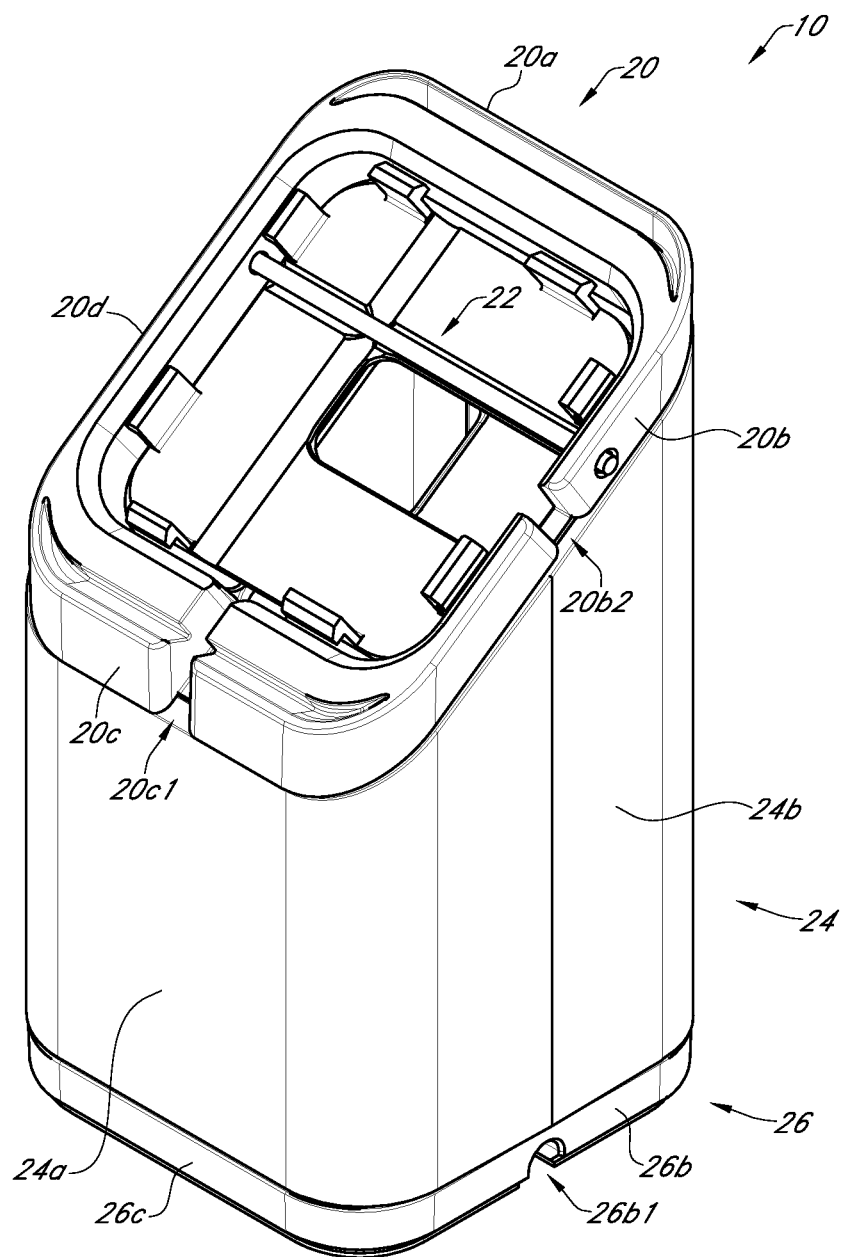
FIG. 10 is a top perspective partial view of stand assembly 10.

Turning to FIG. 10, depicted therein is a top perspective partial view of stand assembly 10.

Figure 11:
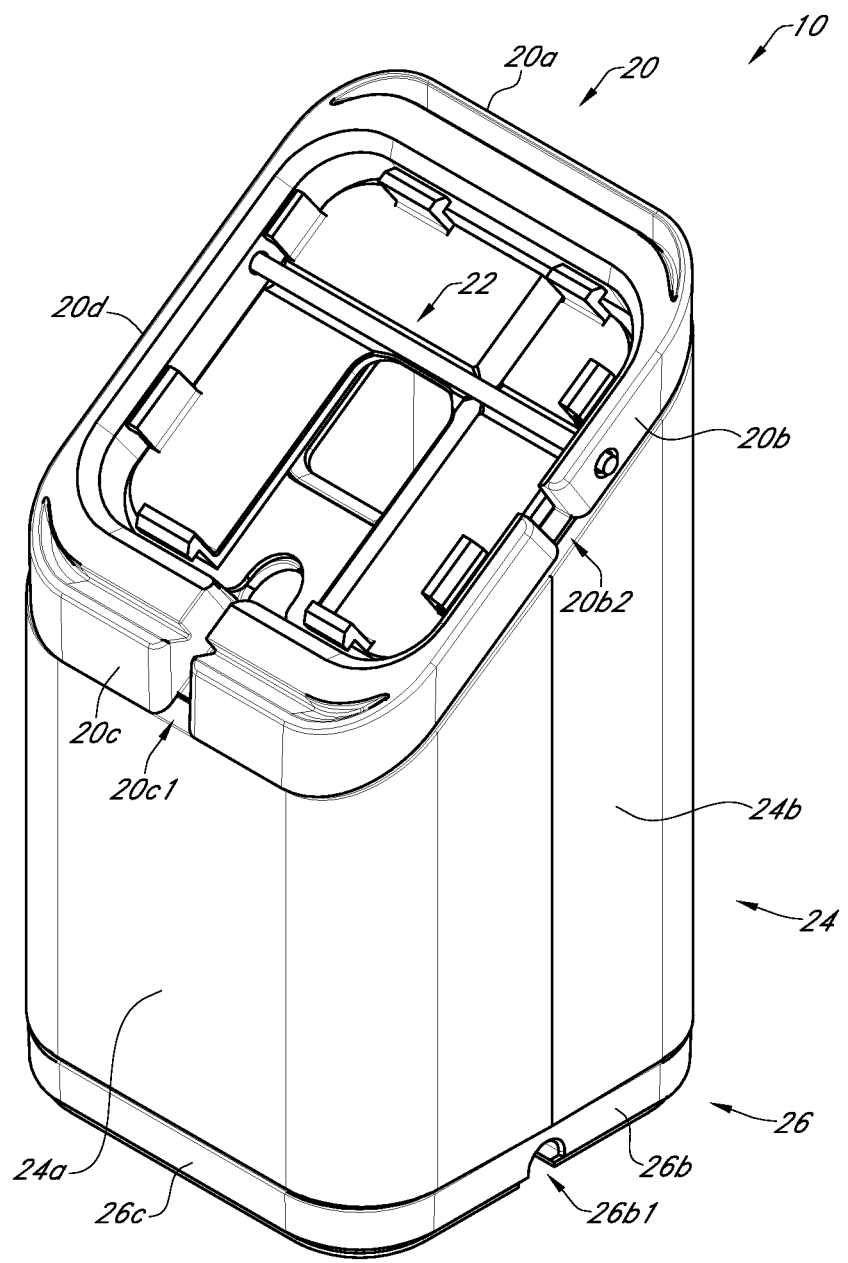
FIG. 11 is a top perspective partial view of stand assembly 10.

Turning to FIG. 11, depicted therein is a top perspective partial view of stand assembly 10.

Figure 12:
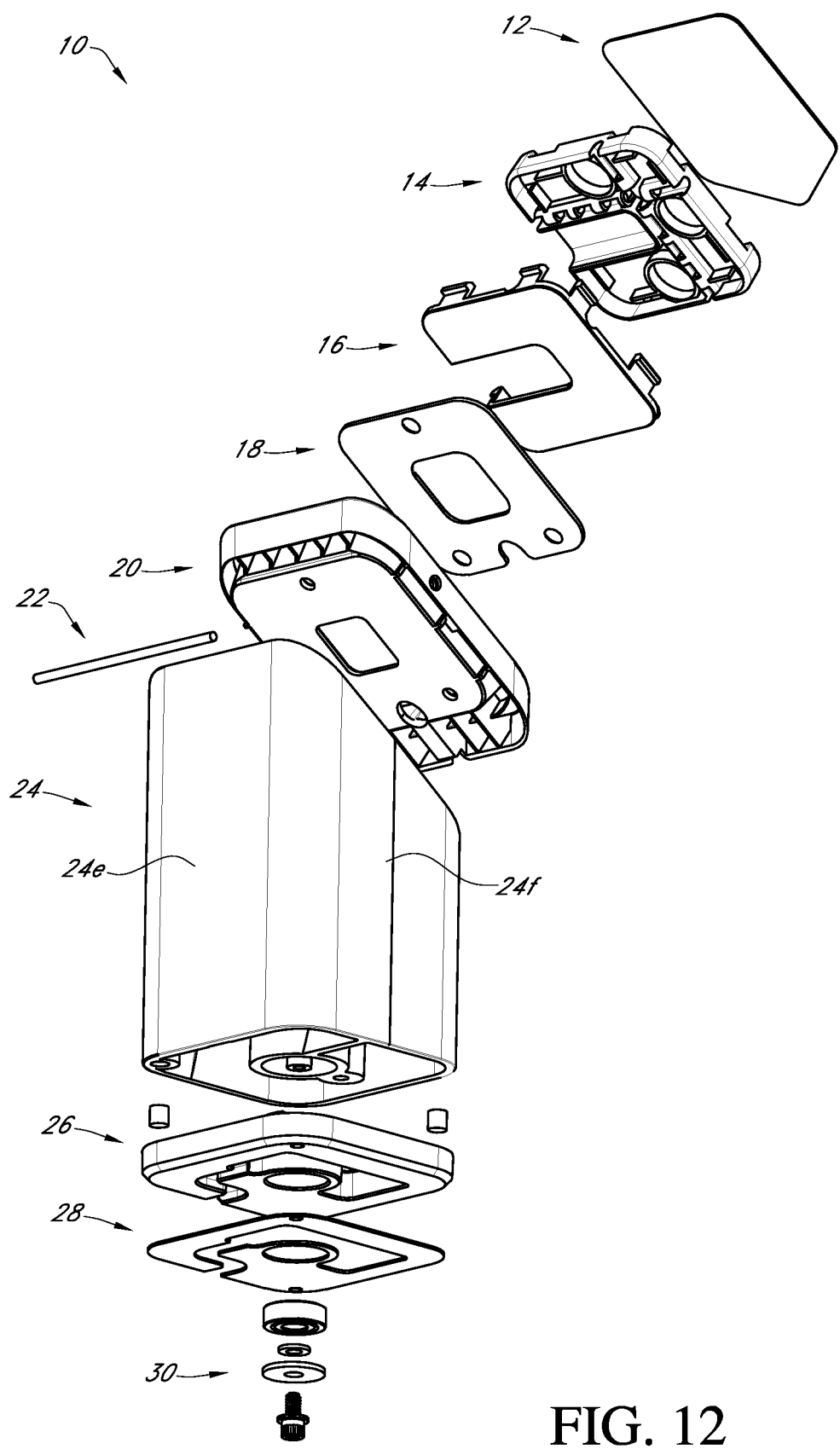
FIG. 12 is an exploded bottom perspective view of stand assembly 10.

Turning to FIG. 12, depicted therein is an exploded bottom perspective view of stand assembly 10. Depicted implementation of column assembly 24 is shown to include column side 24e, and column side 24f.

Figure 13:
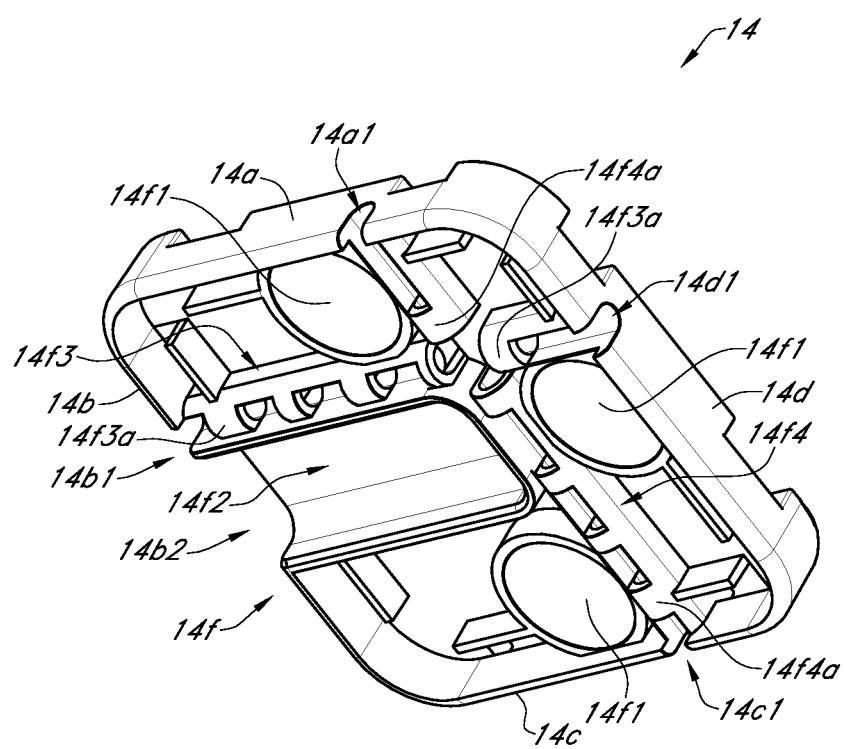
FIG. 13 is a bottom perspective view of upper member 14 of stand assembly 10.

Turning to FIG. 13, depicted therein is a bottom perspective view of upper member 14 of stand assembly 10. Depicted implementation of upper member 14 is shown to include channel 14a1, channel 14d1, lower base side 14f with magnet 14f1, channel 14f2, channel 14f3 with ring member 14f3a, and channel 14f4 with ring member 14f4a. As depicted, magnet 14f1 and metallic plate 18 serve as mechanical couplers to removably couple with each other. As depicted, channel 14f3 with ring member 14f3a, and channel 14f4 with ring member 14f4a are received by channel 16e2 and channel 16e1, respectively, serving as mechanical couplers being removably couplable with pin 22 as well.

Figure 14:
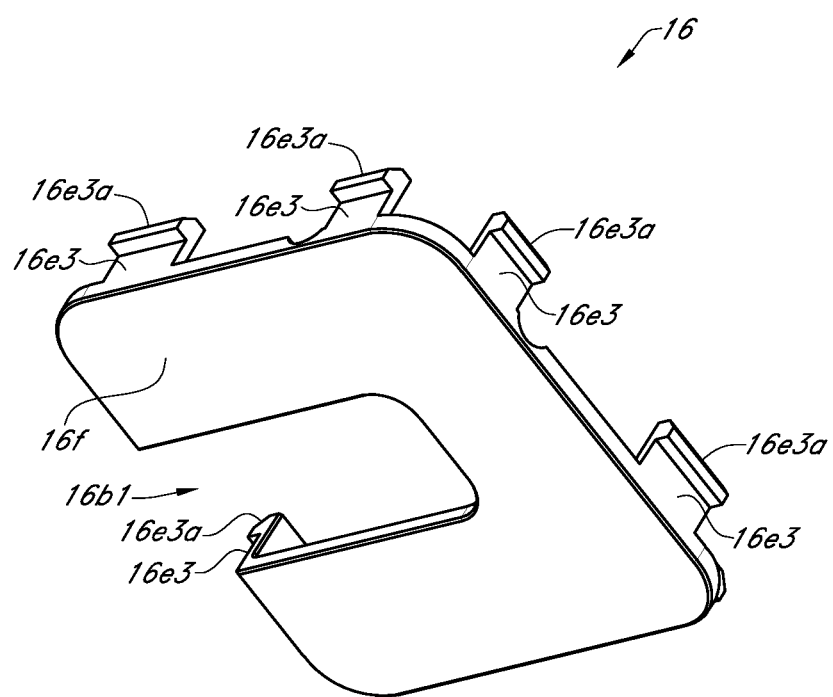
FIG. 14 is a bottom perspective view of lower member 16 of stand assembly 10.

Turning to FIG. 14, depicted therein is a bottom perspective view of lower member 16 of stand assembly 10. Depicted implementation of lower member 16 is shown to include lower base surface 16f.

Figure 15:
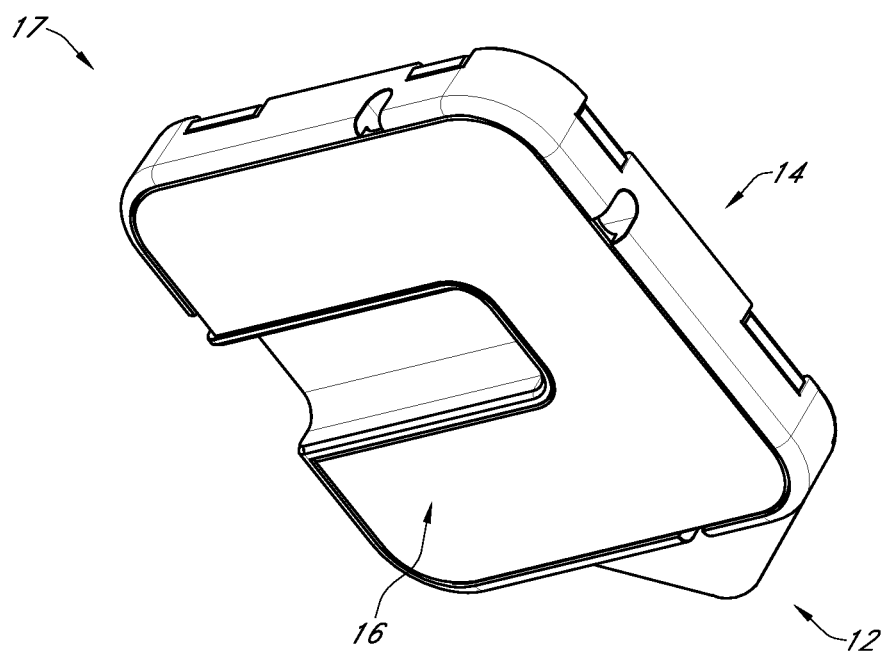
FIG. 15 is a bottom perspective view of upper coupler assembly of stand assembly 10.

Turning to FIG. 15, depicted therein is a bottom perspective view of upper coupler assembly 17 of stand assembly 10.

Figure 16:
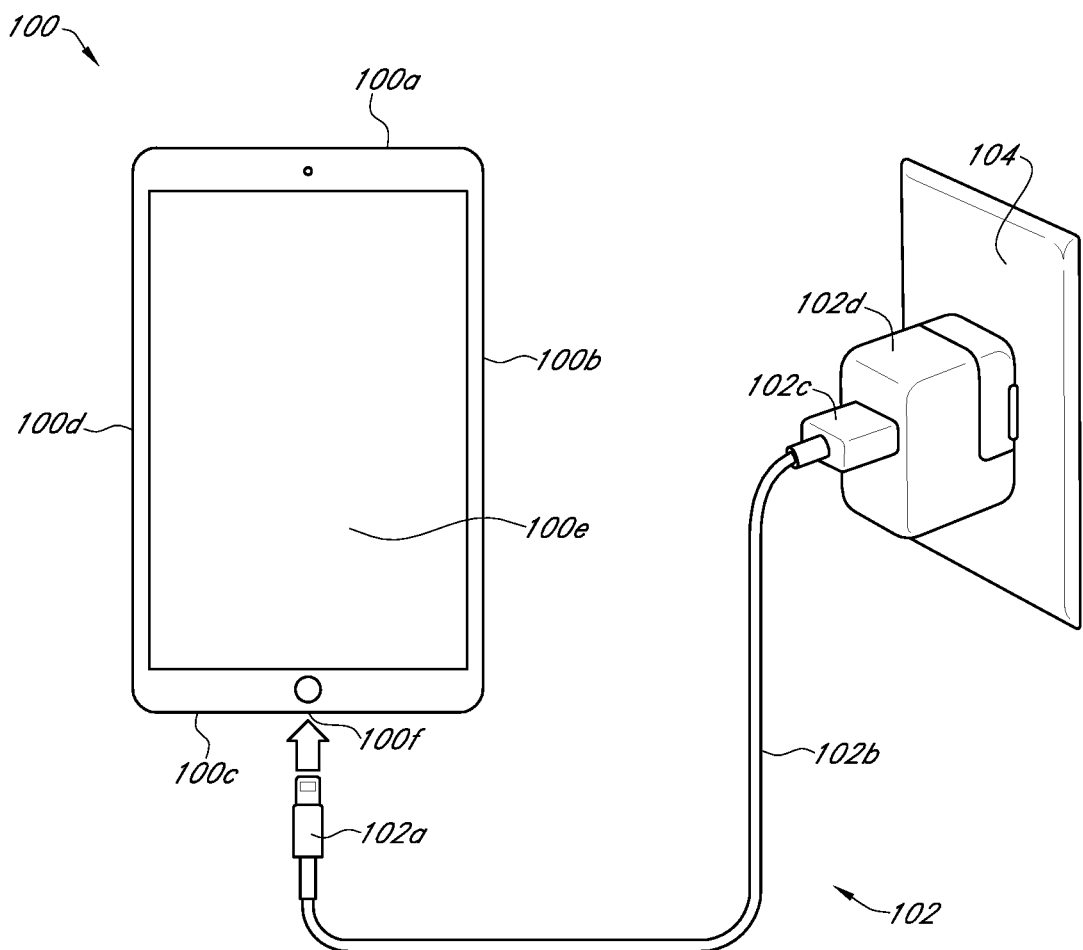
FIG. 16 is a front elevational view of electronic tablet 100 with a perspective view of cable assembly 102 and power outlet 104.

Turning to FIG. 16, depicted therein is a front elevational view of electronic tablet 100 with a perspective view of cable assembly 102 and power outlet 104. Depicted implementation of electronic tablet 100 is shown to include side 100a, side 100b, side 100c, side 100d, front 100e, and port 100f.

Depicted implementation of cable assembly 102 is shown to include connector 102a, cable 102b, connector 102c, and power plug 102d.

Figure 17:
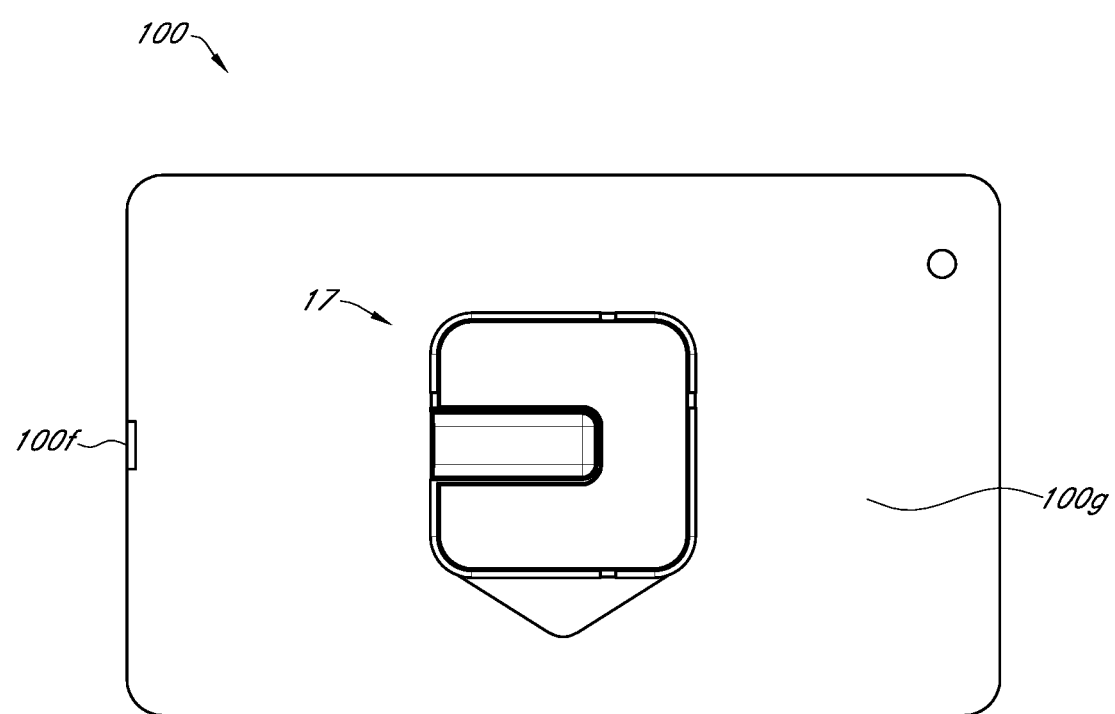
FIG. 17 is a rear elevational view of electronic tablet 100 coupled with upper coupler assembly of stand assembly 10.

Turning to FIG. 17, depicted therein is a rear elevational view of electronic tablet 100 coupled with upper coupler assembly 17 of stand assembly 10. Depicted implementation of electronic tablet 100 is shown to include rear 100g.

Figure 18:
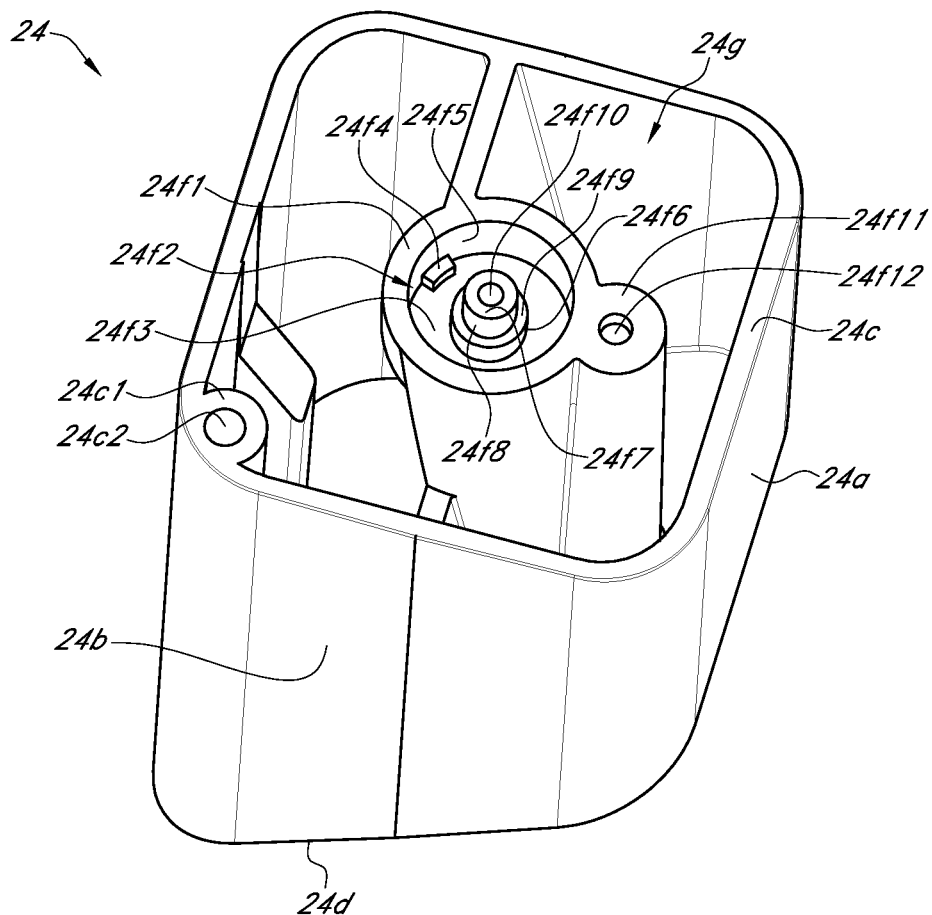
FIG. 18 is an bottom perspective view of column assembly of stand assembly 10.

Turning to FIG. 18, depicted therein is a bottom perspective view of column assembly 24 of stand assembly 10. Depicted implementation of column assembly 24 is shown to include column bottom end 24c with support member 24c1 and magnetic member 24c2, which interacts with magnet 26e3 of foundational platform 26 at two rotational positions of column assembly 24 relative to foundational platform 26. Depicted implementation of column assembly 24 is shown to include column side 24f with cylindrical enclosure 24f1, cylindrical socket 24f2, base 24f3, protrusion stop 24f4, interior surface 24f5, outer cylindrical projection 24f6, end portion 24f7, inner cylindrical projection 24f8, step 24f9, threaded aperture 24f10, support member 24f11, and aperture 24f12. As depicted cylindrical enclosure 24f1 of column assembly 24 rotatably couples with tubular protrusion 26f of foundational platform 26. As depicted column assembly 24 includes interior 24g which can be accessed through aperture 20e2 of the cap member 20 and aperture 18b of the metallic plate 18. As depicted, protrusion stop 24f4 contacts semi-circular projection 26f2 at certain rotational positions of column assembly 24 relative to foundational platform 26 such that column assembly 24 is prevented from completely rotating 360 degrees relative to foundational platform 26. As depicted channel 26b1 of foundational platform 26 can access interior 24g of column assembly 24 via open area 26e5 of foundational platform 26.

Figure 19:
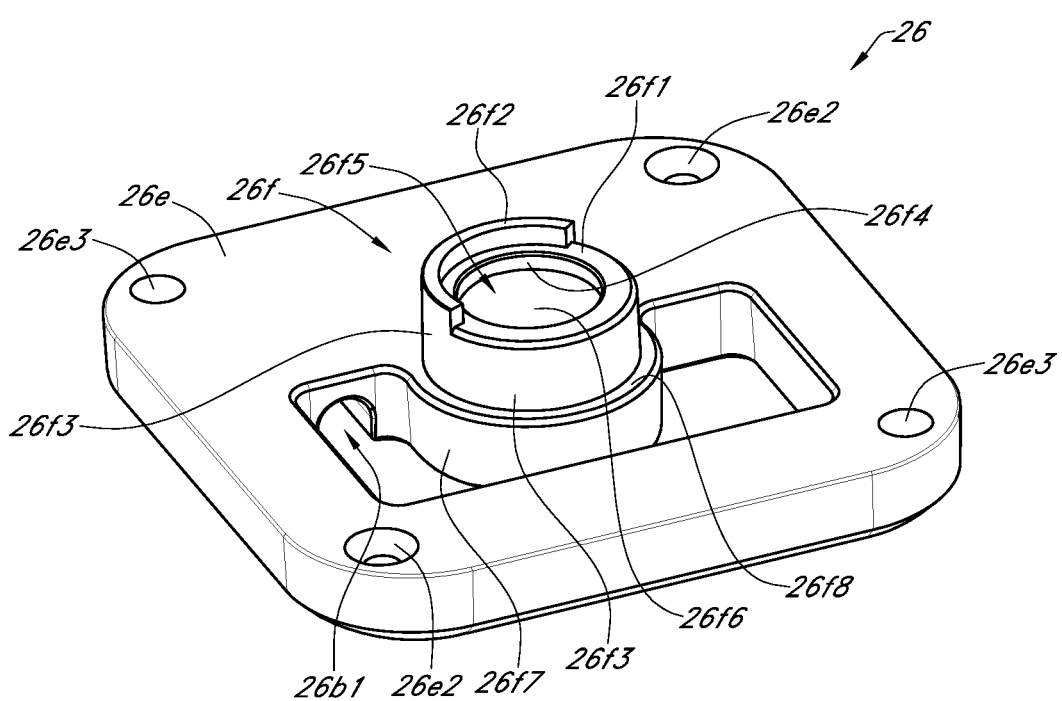
FIG. 19 is a top perspective view of foundational platform of stand assembly 10.

Turning to FIG. 19, depicted therein is a top perspective view of foundational platform 26 of stand assembly 10. Depicted implementation of foundational platform 26 is shown to include cylindrical lip 26f4, passageway 26f5, interior 26f6, perimeter boundary 26f7, and step portion 26f8. As depicted, base plate 26e has a peripheral profile the same as column bottom end 24c.

Figure 20:
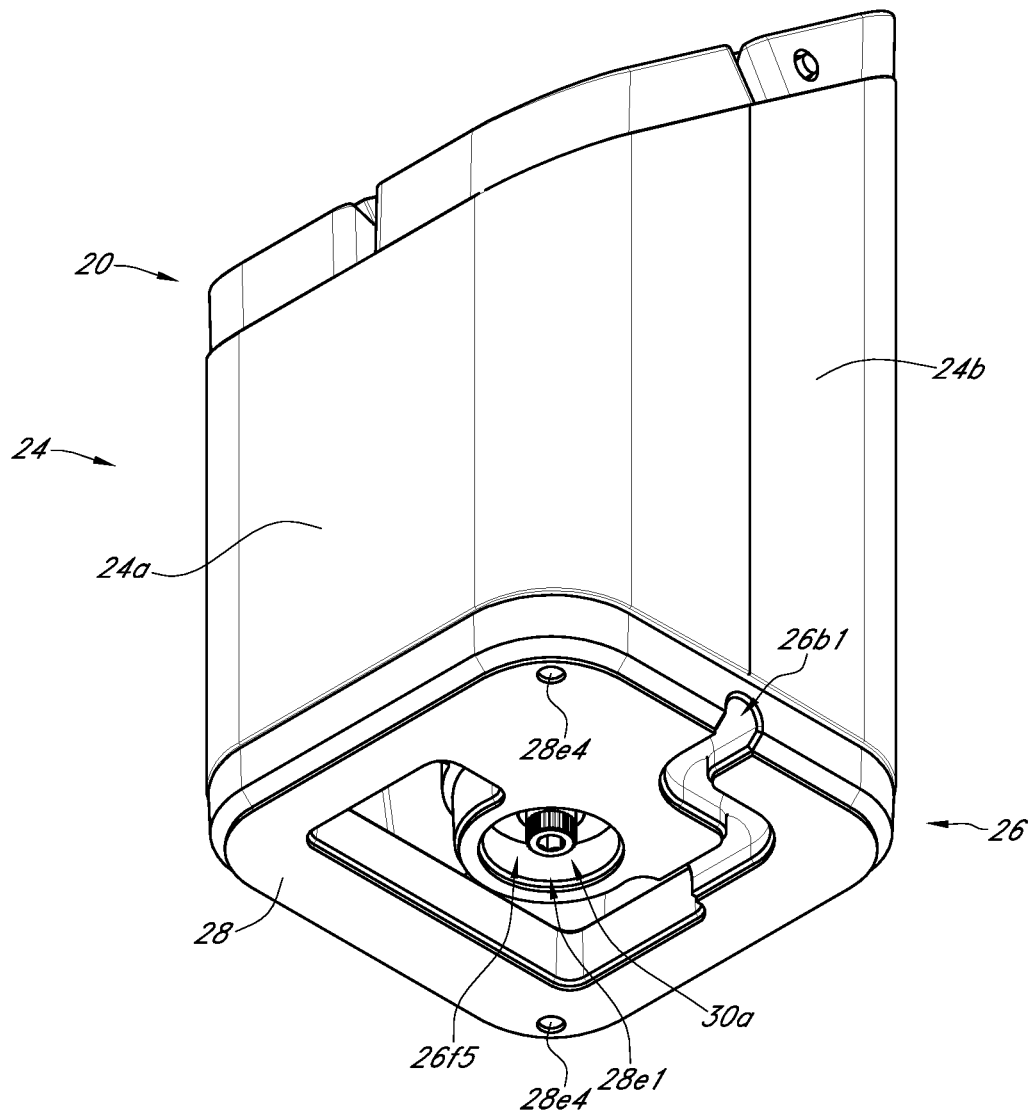
FIG. 20 is a partial bottom perspective view of stand assembly 10.

Turning to FIG. 20, depicted therein is a partial bottom perspective view of stand assembly 10.

Figure 21:
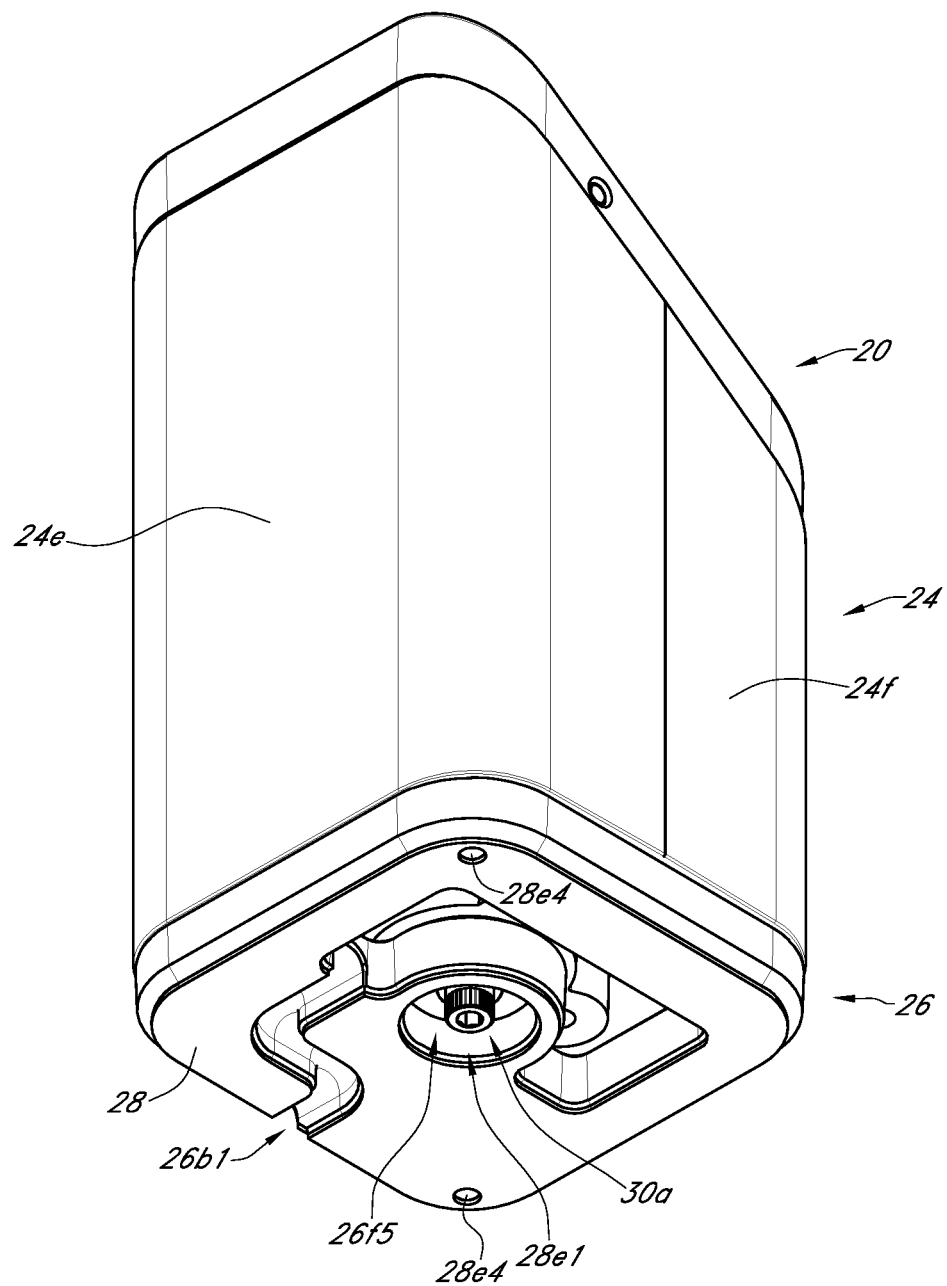
FIG. 21 is a partial bottom perspective view of stand assembly 10.

Turning to FIG. 21, depicted therein is a partial bottom perspective view of stand assembly 10.

Figure 22:
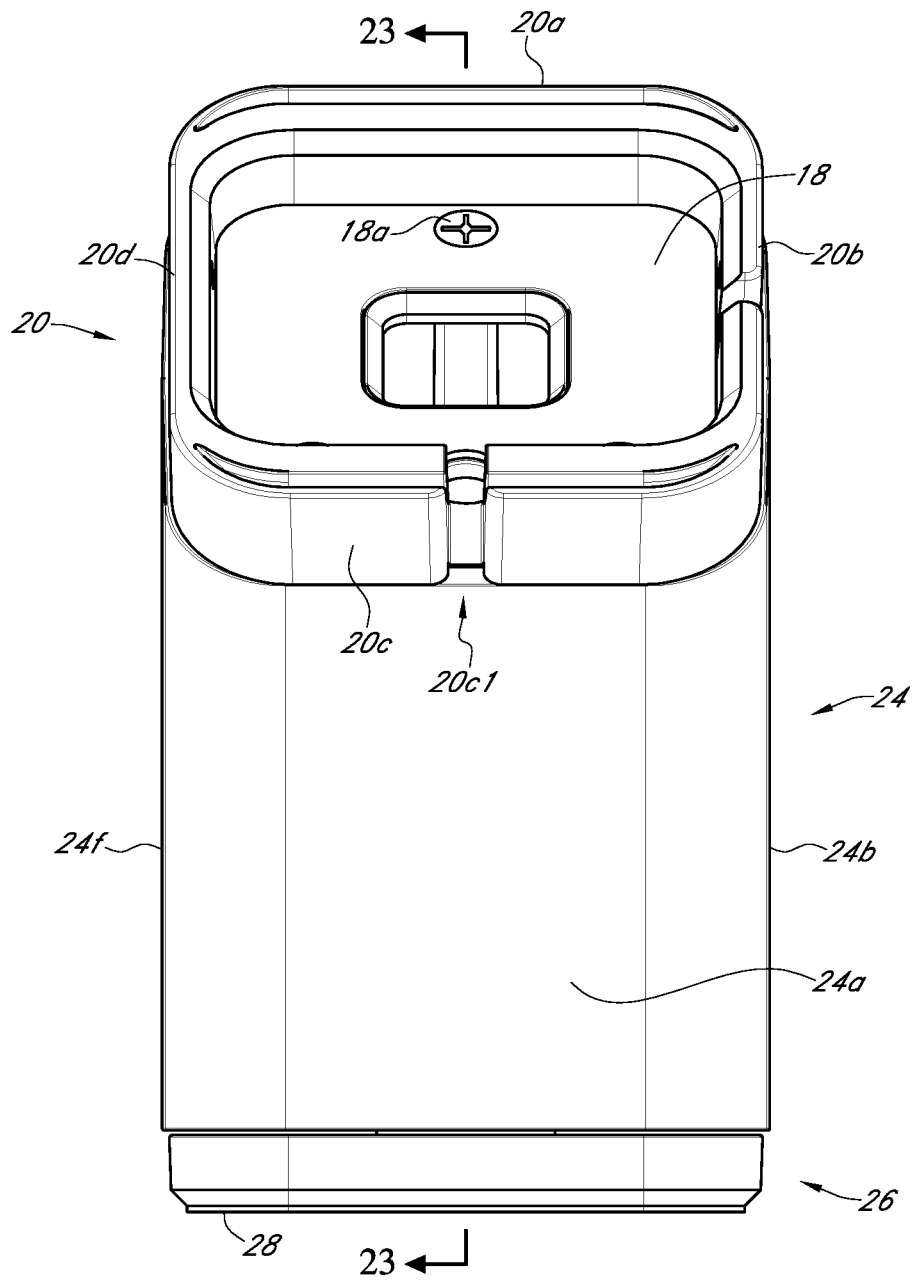
FIG. 22 is a partial side-elevational elevational view of stand assembly 10.

Turning to FIG. 22, depicted therein is a partial side elevational view of stand assembly 10.

Figure 23:
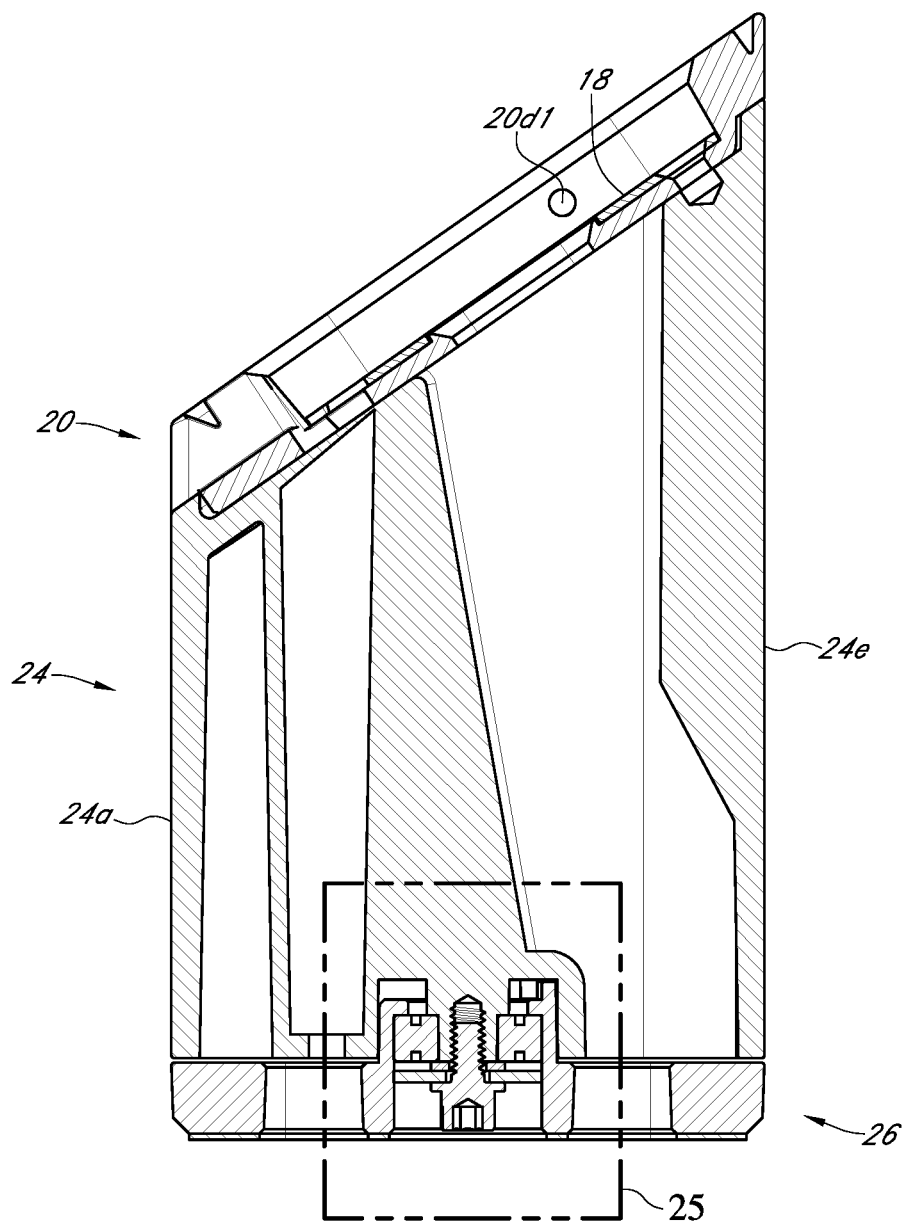
FIG. 23 is a partial cross-sectional side-elevational view of stand assembly 10 taken along the 23-23 cutline of FIG. 22.

Turning to FIG. 23, depicted therein is a cross-sectional elevational view of stand assembly 10 taken along the 23-23 cutline of FIG. 22.

Figure 24:
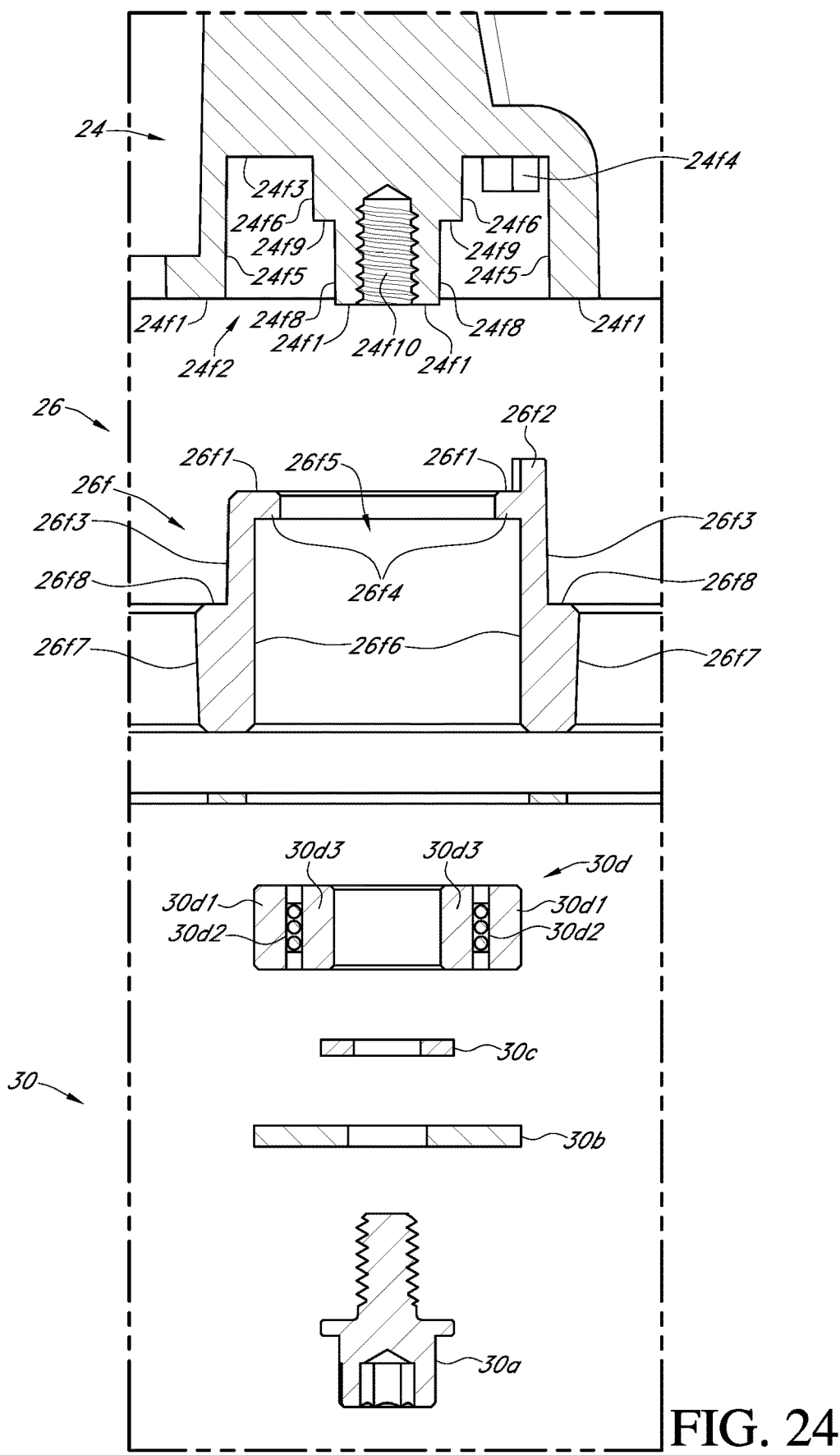
FIG. 24 is an enlarged exploded cross-sectional side-elevational view of a portion of FIG. 23 partially showing stand assembly 10.

Turning to FIG. 24, depicted therein is an enlarged exploded cross-sectional elevational view of a portion of stand assembly 10 shown in FIG. 24. As depicted, bearing assembly 30d of lower coupler assembly 30 is positioned in interior 26f6 of tubular protrusion 26f of foundational platform 26. As depicted, outer race 30d1 of lower coupler assembly 30 contacts cylindrical lip 26f4 of tubular protrusion 26f and inner race 30d3 of lower coupler assembly 30 contacts cylindrical enclosure 24f1 of outer cylindrical projection 24f6 of column assembly 24 being held in place by washer 30c and bolt 30a being threadedly coupled to threaded aperture 24f10.

Figure 25:
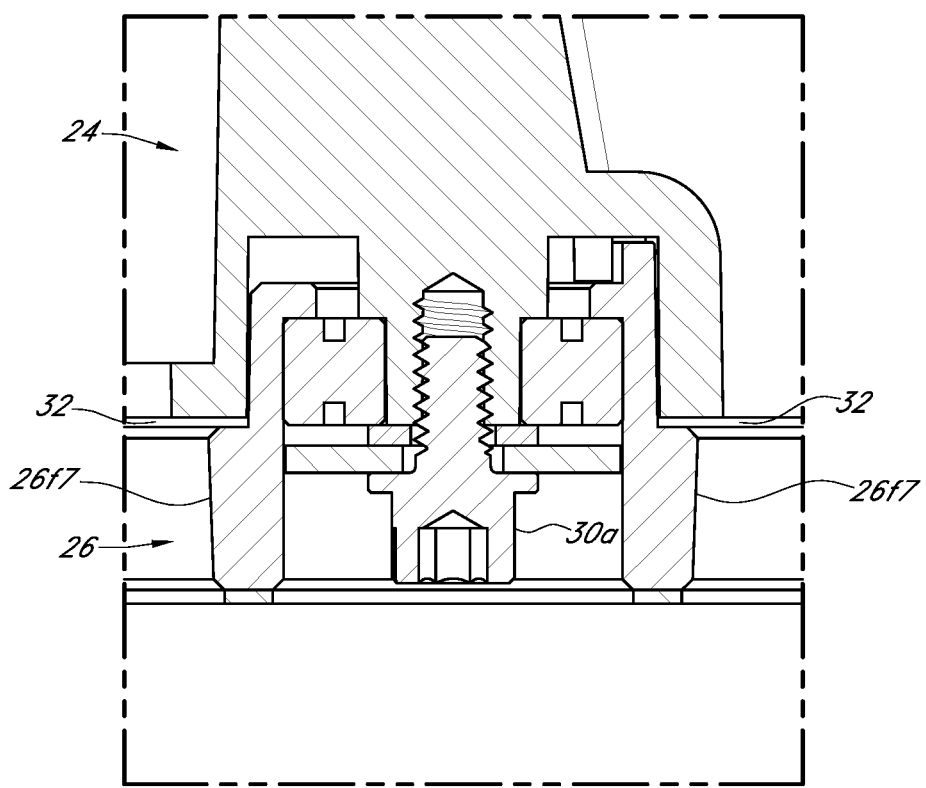
FIG. 25 is an enlarged cross-sectional side-elevational view of a portion of FIG. 23 partially showing stand assembly 10.

Turning to FIG. 25, depicted therein is an enlarged cross-sectional elevational view of a portion of stand assembly 10 shown in FIG. 24. Depicted implementation of stand assembly 10 is shown to include air gap 32 as supported by bearing assembly 30d, which separates column assembly 24 from foundational platform 26.

Figure 26:
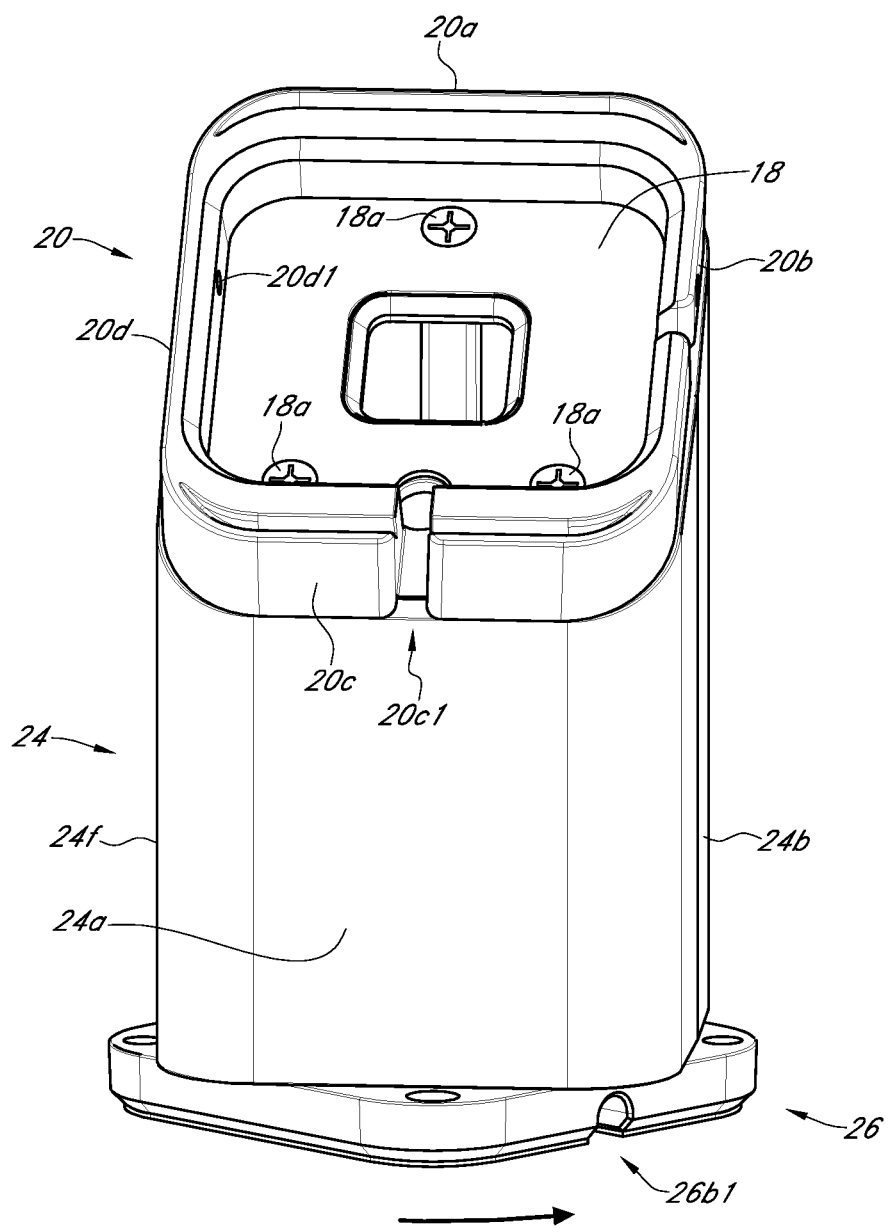
FIG. 26 is a partial perspective view of stand assembly 10.

Turning to FIG. 26, depicted therein is a partial perspective view of stand assembly 10.

Figure 27:
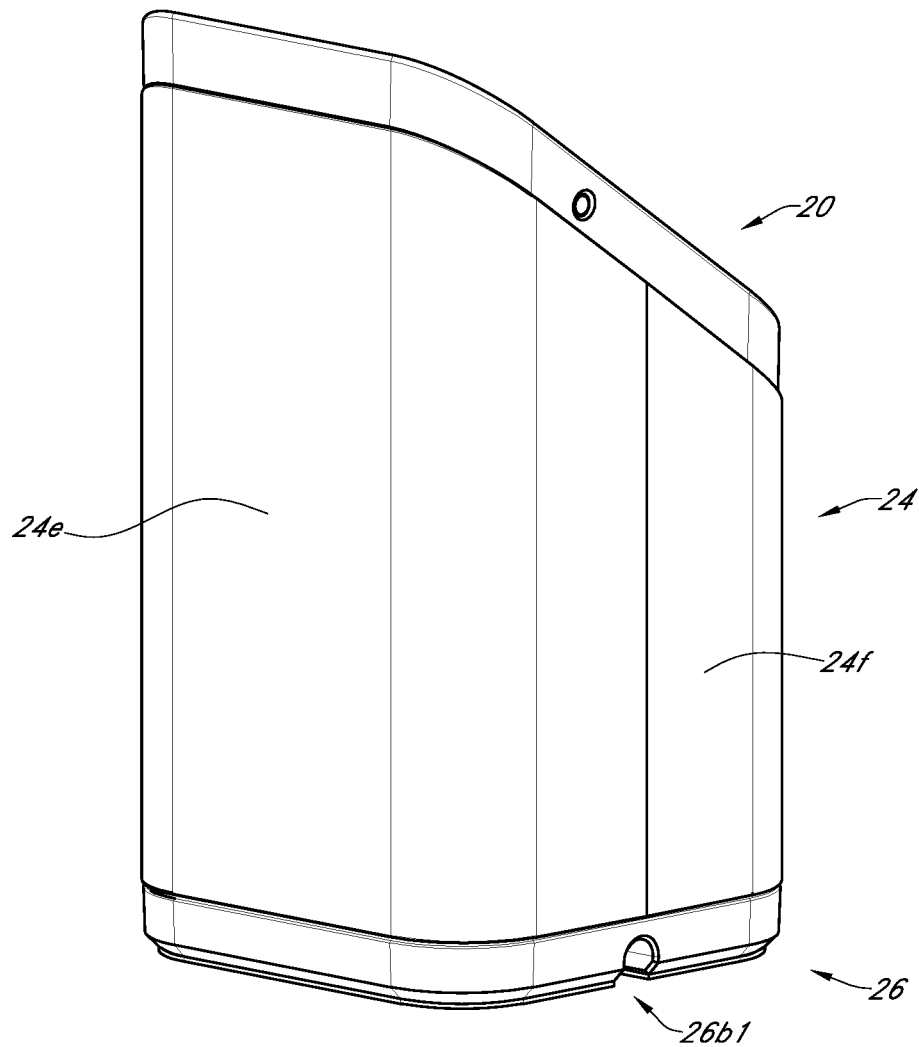
FIG. 27 is a partial perspective view of stand assembly 10.

Turning to FIG. 27, depicted therein is a partial perspective view of stand assembly 10.

While particular aspects of the present subject matter described herein have been shown and described, it will be apparent to those skilled in the art that, based upon the teachings herein, changes and modifications may be made without departing from the subject matter described herein and its broader aspects and, therefore, the appended claims are to encompass within their scope all such changes and modifications as are within the true spirit and scope of the subject matter described herein. It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to claims containing only one such recitation, even when the same claim includes the introductory phrases "one or more" or "at least one" and indefinite articles such as "a" or "an" (e.g., "a" and/or "an" should typically be interpreted to mean "at least one" or "one or more"); the same holds true for the use of definite articles used to introduce claim recitations. In addition, even if a specific number of an introduced claim recitation is explicitly recited, those skilled in the art will recognize that such recitation should typically be interpreted to mean at least the recited number (e.g., the bare recitation of "two recitations," without other modifiers, typically means at least two recitations, or two or more recitations). Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). In those instances where a convention analogous to "at least one of A, B, or C, etc." is used, in general such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, etc.). It will be further understood by those within the art that typically a disjunctive word and/or phrase presenting two or more alternative terms, whether in the description, claims, or drawings, should be understood to contemplate the possibilities of including one of the terms, either of the terms, or both terms unless context dictates otherwise. For example, the phrase "A or B" will be typically understood to include the possibilities of "A" or "B" or "A and B."

With respect to the appended claims, those skilled in the art will appreciate that recited operations therein may generally be performed in any order. Also, although various operational flows are presented in a sequence(s), it should be understood that the various operations may be performed in other orders than those which are illustrated, or may be performed concurrently. Examples of such alternate orderings may include overlapping, interleaved, interrupted, reordered, incremental, preparatory, supplemental, simultaneous, reverse, or other variant orderings, unless context dictates otherwise. Furthermore, terms like "responsive to," "related to," or other past-tense adjectives are generally not intended to exclude such variants, unless context dictates otherwise.

What is claimed is:

1. A stand system for a portable electronic device, the stand system comprising:
   (I) a column assembly including
   a column having a top end, a bottom end, and at least one length,
   wherein the top end of the column is distanced from the bottom end of the column by the at least one length,
   wherein the top end of the column is removably couplable to the portable electronic device; and
   (II) a foundational platform,
   wherein the foundational platform is rotatably coupled to the column assembly and the at least one length of the column is vertically oriented when the foundational platform is positioned on a horizontally oriented surface below the column,
   wherein the foundational platform includes a base plate with an upper surface,
   wherein the foundational platform includes a tubular protrusion centrally positioned on the base plate and extending from the upper surface of the base plate,
   wherein the tubular protrusion includes an interior,
   wherein the tubular protrusion of the foundational platform includes an upper surface, and
   wherein the foundational platform includes a semi-circular projection extending from the upper surface of the tubular protrusion.

2. The stand system of claim 1
   wherein the foundational platform includes a base plate with an upper surface having a peripheral shape, and
   wherein the bottom end of the column has a peripheral shape the same as the peripheral shape of the upper surface of the base plate of the foundational platform.

3. The stand system of claim 1 further including a bearing assembly,
   wherein the bearing assembly separates the column assembly from the foundation platform assembly by an airgap.

4. The stand system of claim 1
   wherein the column assembly includes a cylindrical enclosure rotatably coupled with the tubular protrusion of the foundational platform assembly,
   wherein the cylindrical enclosure includes a base with a protrusion extending therefrom, and
   wherein at a first rotational position of the tubular protrusion relative to the cylindrical enclosure, the protrusion of the base of the cylindrical enclosure contacts the semi-circular projection extending from the upper surface of the tubular protrusion thereby preventing a full 360 degree rotation of the tubular protrusion relative to the cylindrical enclosure.

5. A stand system for a portable electronic device, the stand system comprising:

(I) a column assembly including
a column having a top end, a bottom end, and at least one length,
wherein the top end of the column is distanced from the bottom end of the column by the at least one length,
wherein the top end of the column is removably couplable to the portable electronic device; and
(II) a foundational platform,
wherein the foundational platform is rotatably coupled to the column assembly and the at least one length of the column is vertically oriented when the foundational platform is positioned on a horizontally oriented surface below the column,
wherein the foundational platform includes a base plate with an upper surface,
wherein the foundational platform includes a tubular protrusion centrally positioned on the base plate and extending from the upper surface of the base plate,
wherein the tubular protrusion includes an interior, and
wherein the base plate of the foundational platform includes diagonally spaced apertures shaped to each receive an anchoring screw.

6. The stand system of claim 5
wherein the foundational platform includes at least one magnet embedded in the base plate of the foundational platform adjacent to the upper surface of the base plate,
wherein the column assembly includes at least one magnet embedded in the bottom end of the column, and
wherein the at least one magnet of the foundational platform engages with the at least one magnet of the column assembly when the column assembly is positioned in a first rotational position relative to the foundational platform.

7. The stand system of claim 5
wherein the column assembly includes a cylindrical enclosure having a cylindrical socket with a base and having a centrally positioned cylindrical projection extending from the base of the cylindrical socket, and
wherein the centrally positioned cylindrical projection is rotatably coupled with the interior of the tubular protrusion of the foundational platform assembly.

8. A stand system for a portable electronic device, the stand system comprising:
(I) a column assembly including
a column having a top end, a bottom end, and at least one length,
wherein the top end of the column is distanced from the bottom end of the column by the at least one length,
wherein the top end of the column is removably couplable to the portable electronic device; and
(II) a foundational platform,
wherein the foundational platform is rotatably coupled to the column assembly and the at least one length of the column is vertically oriented when the foundational platform is positioned on a horizontally oriented surface below the column,
wherein the foundational platform includes a base plate with an upper surface,
wherein the foundational platform includes a tubular protrusion centrally positioned on the base plate and extending from the upper surface of the base plate,
wherein the tubular protrusion includes an interior, and
wherein the column including an interior, and
wherein the base plate of the foundational platform has a side and a channel with a channel opening through the side that provides access to the interior of the column.

9. A stand system for a portable electronic device, the stand system comprising:
(I) a column assembly including
a column having a top end, a bottom end, and at least one length,
wherein the top end of the column is distanced from the bottom end of the column by the at least one length,
wherein the top end of the column is removably couplable to the portable electronic device; and
(II) a foundational platform,
wherein the foundational platform is rotatably coupled to the column assembly and the at least one length of the column is vertically oriented when the foundational platform is positioned on a horizontally oriented surface below the column,
wherein the foundational platform includes a base plate with an upper surface,
wherein the foundational platform includes a tubular protrusion centrally positioned on the base plate and extending from the upper surface of the base plate,
wherein the tubular protrusion includes an interior, and
further including a bearing assembly,
wherein the bearing assembly is positioned inside of the interior of the tubular protrusion.

10. The stand system of claim 9
wherein the tubular protrusion includes a concentric lip circumferentially bounding an upper portion of the interior of the tubular protrusion,
wherein the bearing assembly includes a central aperture, an inner race, a plurality of bearings, and an outer race separated from the inner race by the plurality of bearings, and
wherein the outer race of the bearing assembly is in contact with concentric lip of the tubular protrusion.

11. The stand system of claim 9
wherein the column assembly includes a cylindrical enclosure with a base and having a centrally positioned cylindrical projection extending from the base of the cylindrical socket, and
wherein the inner race of the bearing assembly is in contact with the cylindrical projection of the cylindrical enclosure of the column assembly.

12. The stand system of claim 11 further including a bolt and a washer,
wherein the bearing assembly includes a central aperture, an inner race, a plurality of bearings, and an outer race separated from the inner race by the plurality of bearings,
wherein the cylindrical projection of the cylindrical enclosure includes a threaded aperture coupled with the bolt, and
wherein the washer is pressed against the inner race of the bearing assembly by the bolt.

13. A stand system for a portable electronic device, the stand system comprising:
(I) a column assembly including
a column having a top end, a bottom end, and at least one length,
wherein the top end of the column is distanced from the bottom end of the column by the at least one length,
wherein the top end of the column is removably couplable to the portable electronic device; and
(II) a foundational platform,
wherein the foundational platform includes a base plate with an upper surface, wherein the foundational platform includes a tubular protrusion centrally positioned on the base plate and extending from the upper surface of the base plate, wherein the tubular protrusion includes an interior, wherein the tubular protrusion of the foundational platform is rotatably coupled to the column assembly, wherein the tubular protrusion of the foundational platform includes an upper surface, and wherein the foundational platform includes a semi-circular projection extending from the upper surface of the tubular protrusion, wherein the column assembly includes a cylindrical enclosure rotatably coupled with the tubular protrusion of the foundational platform assembly, wherein the cylindrical enclosure includes a base with a protrusion extending therefrom, and wherein at a first rotational position of the tubular protrusion relative to the cylindrical enclosure, the protrusion of the base of the cylindrical enclosure contacts the semi-circular projection extending from the upper surface of the tubular protrusion thereby preventing a full 360 degree rotation of the tubular protrusion relative to the cylindrical enclosure.

14. The stand system of claim 13 wherein the column assembly includes a cylindrical enclosure having a cylindrical socket with a base and having a centrally positioned cylindrical projection extending from the base of the cylindrical socket, and wherein the centrally positioned cylindrical projection is rotatably coupled with the interior of the tubular protrusion of the foundational platform assembly.

\* \* \* \* \*